(12) United States Patent
Youn

(10) Patent No.: US 9,310,129 B2
(45) Date of Patent: Apr. 12, 2016

(54) CONDENSING DEHUMIDIFIER

(75) Inventor: You-jung Youn, Gyeonggi-do (KR)

(73) Assignee: DAEHAN ELECTRIC CO., LTD., Danwon-Gu, Ansan-Shi, Gyeonggi-Do (KR)

( * ) Notice: Subject to any disclaimer, the term of this patent is extended or adjusted under 35 U.S.C. 154(b) by 194 days.

(21) Appl. No.: 14/113,891

(22) PCT Filed: Feb. 29, 2012

(86) PCT No.: PCT/KR2012/001545
§ 371 (c)(1),
(2), (4) Date: Jan. 24, 2014

(87) PCT Pub. No.: WO2013/008991
PCT Pub. Date: Jan. 17, 2013

(65) Prior Publication Data
US 2014/0131903 A1    May 15, 2014

(30) Foreign Application Priority Data

Jul. 12, 2011 (KR) ........................ 10-2011-0068682

(51) Int. Cl.
| | | |
|---|---|---|
| *F26B 3/06* | (2006.01) | |
| *B29B 13/06* | (2006.01) | |
| *F26B 9/06* | (2006.01) | |
| *F26B 21/04* | (2006.01) | |
| *F26B 21/08* | (2006.01) | |
| *F26B 21/02* | (2006.01) | |

(52) U.S. Cl.
CPC . *F26B 3/06* (2013.01); *B29B 13/06* (2013.01); *B29B 13/065* (2013.01); *F26B 9/06* (2013.01); *F26B 21/02* (2013.01); *F26B 21/04* (2013.01); *F26B 21/086* (2013.01)

(58) Field of Classification Search
CPC ........ B29B 13/06; B29B 13/065; F26B 3/06; F26B 9/06; F26B 21/04; F26B 21/086; F26B 21/02

USPC ......... 261/139, 140.1, 140.2, 54, 63, DIG. 10
See application file for complete search history.

(56) References Cited

U.S. PATENT DOCUMENTS

| | | | | |
|---|---|---|---|---|
| 3,010,216 | A * | 11/1961 | Ravet | F26B 5/04 34/403 |
| 3,734,810 | A * | 5/1973 | Davis | F25B 41/04 165/240 |
| 4,603,489 | A * | 8/1986 | Goldberg | D06F 58/02 34/605 |
| 2010/0275775 | A1* | 11/2010 | Griffiths | B01D 53/0454 95/18 |

FOREIGN PATENT DOCUMENTS

| | | |
|---|---|---|
| JP | 2010-120278 | 6/2010 |
| KR | 10-2005-0118481 | 12/2005 |
| KR | 10-2009-0030793 | 3/2009 |
| KR | 10-2011-0024698 | 3/2011 |

* cited by examiner

*Primary Examiner* — Charles Bushey
(74) *Attorney, Agent, or Firm* — Nixon Peabody LLP; David S. Resnick; David F. Crosby

(57) ABSTRACT

According to the present invention, a condensing dehumidifier includes: a main body having a space for receiving an object to be dried, and an inlet and an outlet formed at the top and bottom, respectively, of the receiving space; a drying unit for supplying heated air through the main body inlet to the receiving space; a condensing unit for cooling and condensing the heated air discharged through the main body outlet and separating the air into condensed water and dry air; a first pipe connecting the main body outlet and the condensing unit to each other, and transferring the heated air discharged through the main body outlet to the condensing unit; a second pipe connecting the condensing unit and the drying unit to each other, and transferring the dry air separated by the condensing unit to the drying unit; and an intermediate pipe one end of which is branched from the first pipe, and the other end of which is connected to the second pipe, wherein a portion of the heated air discharged through the main body outlet passes through the intermediate pipe past the drying unit and is supplied to the receiving space.

3 Claims, 4 Drawing Sheets

CONDENSING DEHUMIDIFIER

CROSS-REFERENCE TO RELATED APPLICATIONS

This application is a 35 U.S.C. §371 National Phase Entry Application of International Application No. PCT/KR2012/001545 filed Feb. 29, 2012, which designates the U.S., and which claims benefit of Korean Patent Application No. 10-2011-0068682 filed Jul. 12, 2011, the contents of each of which are incorporated herein by reference in their entireties.

TECHNICAL FIELD

The present invention relates to a condensing dehumidifier having improved efficiency, and more particularly, to a condensing dehumidifier capable of improving drying efficiency by resupplying some of heated air discharged after performing a drying function, without passing through a condenser.

BACKGROUND ART

As a technique on a condensing dehumidifier capable of improving drying efficiency, Korean Patent No. 10-0892601 (hereinafter, referred to as "the prior art") is disclosed, entitled "Moisture removing apparatus of plastic material using condensing phenomenon by thermoelectric element or thermal medium," filed and registered by the applicant (Korea Electric Industry Company).

The prior art is constituted by a source material storage hopper configured to store a plastic material; an air supply pipe having one end installed in the source material storage hopper and the other end connected to an air heater; the air heater in which a heater having one end connected to the air supply pipe and the other end connected to a blower is installed; the blower having one end connected to the air heater and the other end connected to a condensing unit; the condensing unit in which a cooling coil having one end connected to the blower and the other end connected to an air cooler is installed; a cooling unit configured to circulate cooling water through the condensing unit; the air cooler having one end connected to the condensing unit and the other end connected to an air filter; and the air filter having one end connected to the air cooler and the other end connected to an upper portion of the source material storage hopper, wherein the cooling unit is constituted by a cooling fan, a compressor, and a coolant circulation pipe.

According to the prior art, the air discharged after drying the plastic material is condensed, the air from which moisture is removed is heated again, and then, the air is resupplied to the source material storage hopper, thereby more effectively drying the plastic material.

SUMMARY OF INVENTION

Technical Problem

In the prior art, as the condensing unit, the cooling unit, the air heater, and so on, are provided, while an apparatus for removing moisture of the plastic material by circulating and reusing the air used to dry the plastic material to do away with the necessity of supplying the air from the outside and have a simple structure to reduce manufacturing costs is provided, the air cannot be easily condensed by the condensing unit as a large amount of air is rapidly circulated, and the entire circulated air should be cooled, condensed, and then reheated, degrading drying efficiency of the apparatus.

That is, even though the entire circulated air cannot be sufficiently condensed, the entire air is cooled and reheated to cause waste of energy.

Solution to Problem

In order to achieve the aforementioned objects, a condensing dehumidifier according to the present invention includes a main body having a drying target receiving section, and an inlet and an outlet, which are formed at upper and lower portions thereof, respectively; a drying unit configured to supply heated air into the receiving section through the inlet of the main body; a condensing unit configured to cool and condense the heated air discharged through the outlet of the main body and divide the heated air into condensing water and dry air; a first pipe configured to connect the outlet of the main body and the condensing unit and convey the heated air discharged through the outlet of the main body to the condensing unit; a second pipe configured to connect the condensing unit and the drying unit and convey the dry air separated by the condensing unit to the drying unit; and an intermediate pipe having one end branched off from the first pipe and the other end connected to the second pipe, wherein some of the heated air discharged through the outlet of the main body is supplied into the receiving section through the intermediate pipe via the drying unit.

In addition, a flow rate adjustment unit may be installed at the intermediate pipe.

Further, a cooling unit configured to initially cool the heated air discharged through the outlet of the main body may be installed at the first pipe.

Furthermore, the condensing unit may be constituted by a first condenser formed of a cooling coil through which coolant circulates, or a second condenser formed of a heat absorption plate and a heat radiating plate, which are formed of a plurality of diaphragms, and a thermoelectric element disposed therebetween.

In addition, the condensing unit is constituted by the first condenser and the second condenser, which are connected to each other.

Advantageous Effects of Invention

In the condensing dehumidifier having improved efficiency according to the present invention, some of the heated air discharged through the main body outlet is circulated through the intermediate pipe without passing through the condensing unit, and thus the loads of the condensing unit and the drying unit are reduced to save energy and improve efficiency of the apparatus.

DESCRIPTION OF EMBODIMENTS

Hereinafter, an embodiment of the present invention will be described in detail with reference to the accompanying drawings.

Figure 1:
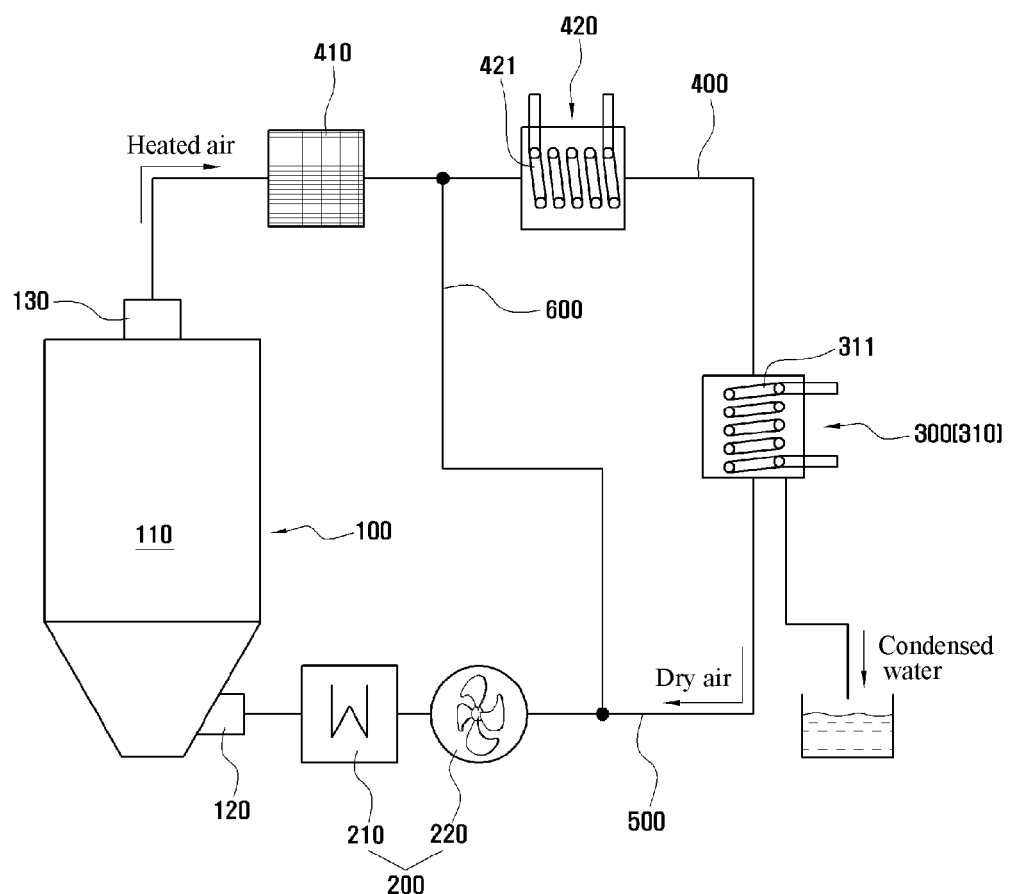
FIG. 1 is a configuration view showing a state in which a condensing unit of a first implementation example is applied to a dehumidifier according to the present invention.
Figure 2:
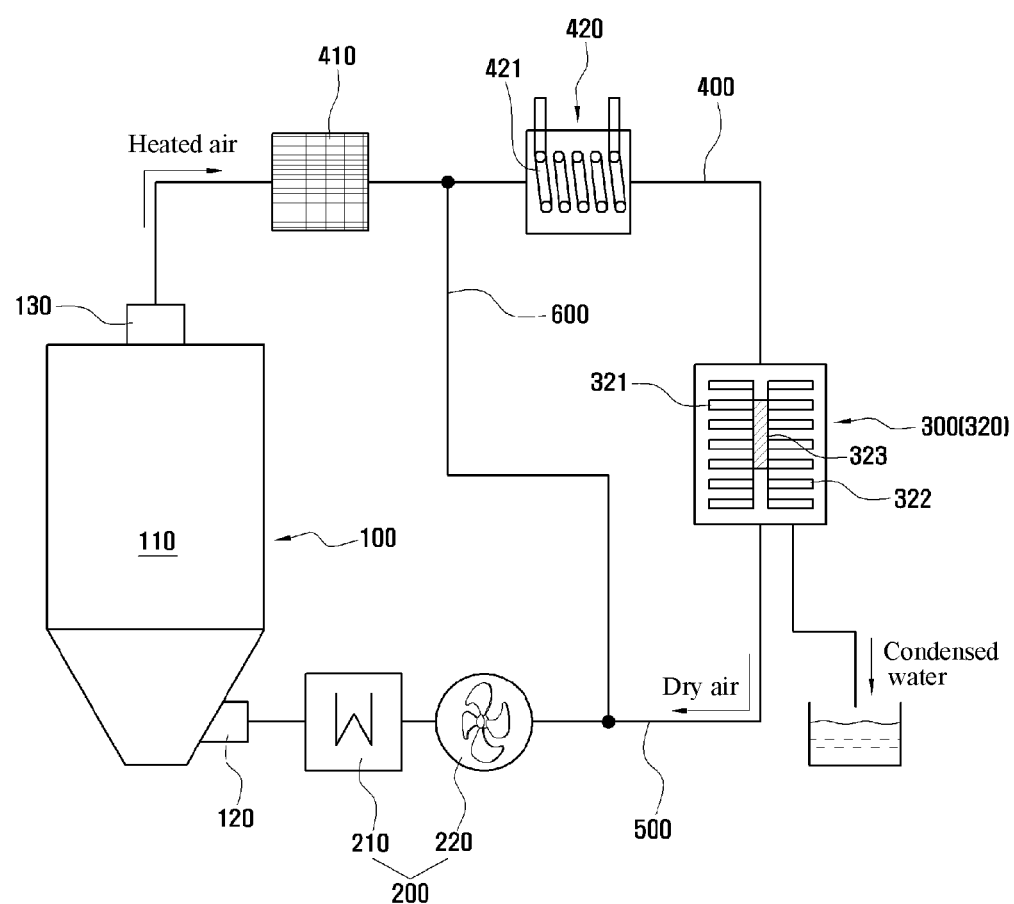
FIG. 2 is a configuration view showing a state in which a condensing unit of a second implementation example is applied to the dehumidifier according to the present invention.
Figure 3:
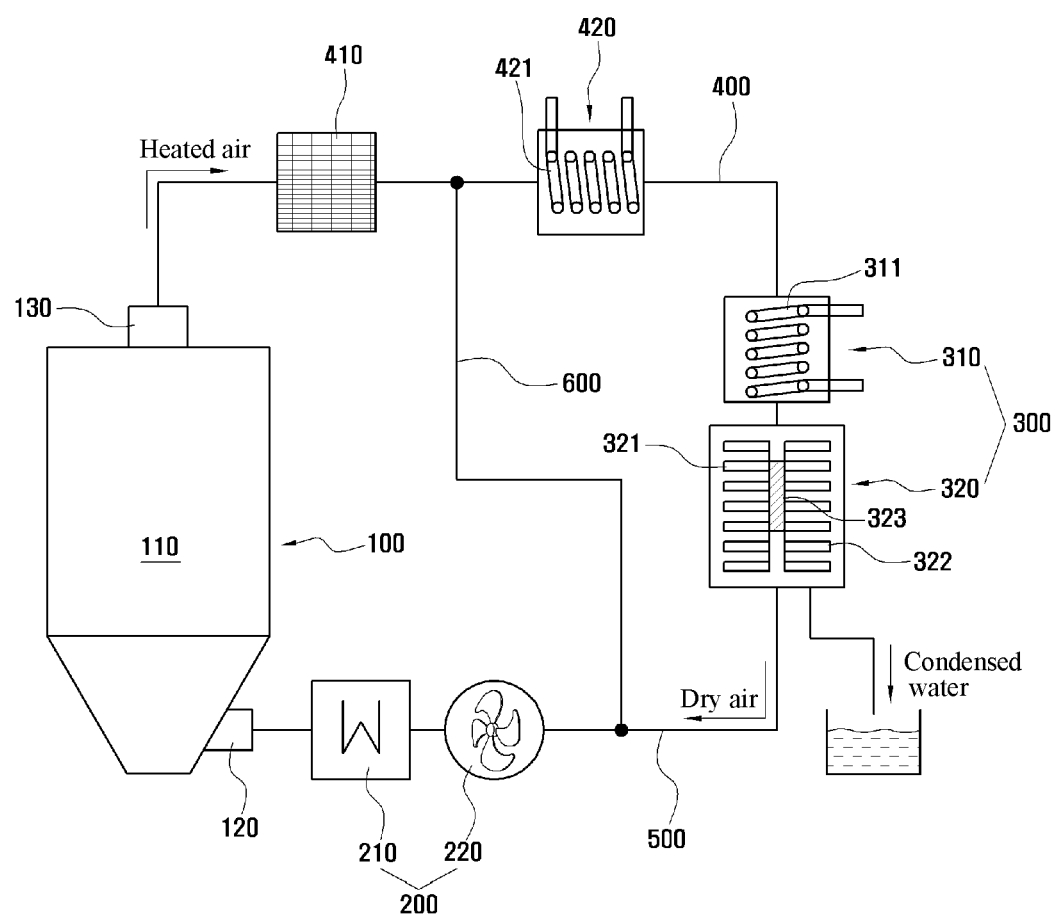
FIG. 3 is a configuration view showing a state in which a condensing unit of a third implementation example is applied to the dehumidifier according to the present invention.

As shown in FIGS. 1 to 3, a condensing dehumidifier (hereinafter, referred to as a "dehumidifier") according to the present invention is generally constituted by a main body 100, a drying unit 200, a condensing unit 300, a first pipe 400, a second pipe 500 and an intermediate pipe 600.

Reviewing the respective components, the main body 100 includes a drying target receiving section 110, and an inlet 120 and an outlet 130, which are formed at upper and lower portions of the receiving section 110, respectively.

As shown in FIGS. 1 to 3, the main body 100 has a hopper shape in which a drying target formed of a plastic material is received.

However, here, the drying target may be various products, which is to be dried, for example, various agricultural and marine products, fibers or textile goods, shoes, or the like, and a structure of the main body 100 may be varied and modified in various shapes within a range that satisfies a condition in which the drying target can be received.

The drying unit 200 is configured to supply heated air into the receiving section 110 through the inlet 120 of the main body 100, and includes the heater 210 connected to the inlet 120 and a blower 220 configured to supply air into the heater 210.

Here, the heater 210 may be a conventional electric heater or burner.

In addition, the blower 220 may be disposed such that the air can be supplied into the receiving section 110 via the heater 210. As shown, the blower 220 is disposed in rear of the heater 210 to directly supply the air heated by the heater 210 into the receiving section 110.

Eventually, drying unit 200 supplies the heated air into the receiving section 110 to dry the drying target.

The condensing unit 300 is configured to cool and condense the heated air discharged through the outlet 130 of the main body 100 to separate the heated air into condensing water and dry air, and as shown in FIGS. 1 to 3, may be implemented as first to third implementation examples.

Hereinafter, the first to third implementation examples of the condensing unit 300 will be described.

As shown in FIG. 1, the condensing unit 300 according to the first implementation example includes a first condenser 310 constituted by a cooling coil 311 through which coolant circulates.

In addition, as shown in FIG. 2, the condensing unit 300 according to the second implementation example includes a second condenser 320 constituted by a heat absorption plate 321 and a heat radiating plate 322, which are formed of a plurality of diaphragms, and a thermoelectric element 323 disposed therebetween.

Further, as shown in FIG. 3, the condensing unit 300 according to the third implementation example is configured by connecting the first and second condensers 310 and 320.

Here, in the condensing unit 300 according to the third implementation example, the number of the first and second condensers 310 and 320 may be varied according to a drying capacity of the main body 100, and disposition of the two condensers 310 and 320 connected to each other may be variously modified.

Meanwhile, the condensing water separated by the condensing unit 300 may be discharged to the outside through a drainage facility or temporarily stored in a separate storage tank, and the dry air separated from the condensing water is supplied into the drying unit 200 through the second pipe 500 (to be described below).

The first pipe 400 connects the outlet 130 of the main body 100 and the condensing unit 300 to each other and conveys the heated air discharged through the outlet 130 to the condensing unit 300.

Meanwhile, as shown, a filter 410 and a cooling unit 420 may be installed at the first pipe 400.

Here, the filter 410 is disposed in the vicinity of the outlet 130 of the main body 100 and configured to remove foreign substances contained in the heated air discharged through the outlet 130.

In addition, the cooling unit 420 is disposed in the vicinity of the condensing unit 300 and constituted by a cooling coil 421 through which the coolant circulates like the first condenser 310 such that the heated air discharged through the outlet 130 of the main body 100 is initially cooled to be supplied into the condensing unit 300.

Here, "initial cooling" means that the heated air discharged through the outlet 130 is previously cooled to more easily perform cooling and condensing processes by the condensing unit 300.

The second pipe 500 connects the condensing unit 300 and the drying unit 200 to each other, and the dry air separated from the condensing water by the condensing unit 300 is conveyed to the drying unit 200.

The intermediate pipe 600 has one end branched off from the first pipe 400 and the other end connected to the second pipe 500. Accordingly, some of the heated air discharged through the outlet 130 of the main body 100 can be supplied into the receiving section 110 through the intermediate pipe 600 via the drying unit 200.

Eventually, as some of the heated air discharged through the outlet 130 of the main body 100 is circulated through the intermediate pipe 600 without passing through the condensing unit 300, loads of the condensing unit 300 and the drying unit 200 are reduced to save energy and improve efficiency of the dehumidifier.

The intermediate pipe 600 may be branched off from any place of the first pipe 400 but may be branched off between the filter 410 and the cooling unit 420 via the filter 410 so that the heated air is not cooled by the cooling unit 420.

Figure 4:
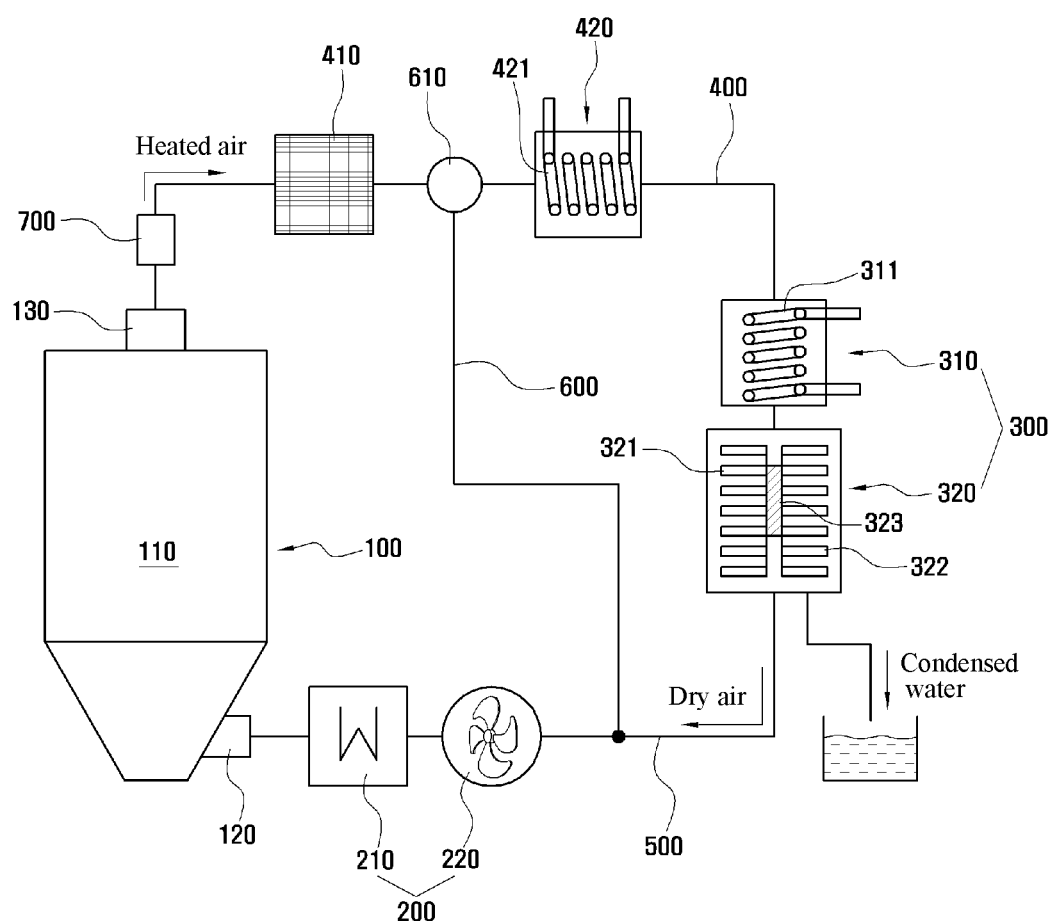
FIG. 4 is a configuration view showing a state in which a flow rate adjustment unit is provided in FIG. 3.

Meanwhile, as shown in FIG. 4, a flow rate adjustment unit 610 may be installed at the intermediate pipe 600.

The flow rate adjustment unit 610, which may be a known automatic regulation valve, is configured to adjust an amount of the heated air introduced into the intermediate pipe 600. Here, a humidity sensor 700 is installed at the receiving section 110 of the main body 100 or the first pipe 400, and a separate control unit (not shown) connected to the flow rate adjustment unit 610 and the humidity sensor 700 may be provided.

Accordingly, the humidity sensor 700 measures humidity of the heated air containing moisture generated by drying the drying target, and then, the control unit controls an opening level of the flow rate adjustment unit 610 according to a measurement value of the humidity sensor 700, so that the dehumidifier can be operated in a state in which optimal efficiency is exhibited according to a dried level of the drying target.

While the present invention has been described with reference to the accompanying drawings with focusing on the condensing dehumidifier having improved efficiency and a specific shape and structure, the present invention may be variously transformed and modified by those skilled in the art and the transformation and modification will be construed to fall into the scope of the present invention.

The invention claimed is:

1. A condensing dehumidifier comprising:
   a main body having a drying target receiving section, and an inlet which is formed at a lower portion of the drying target receiving section and an outlet which is formed at an upper portion of the drying target receiving section;
   a drying unit configured to supply heated air into the receiving section through the inlet of the main body;
   a condensing unit configured to cool and condense the heated air discharged through the outlet of the main body and separate the heated air into condensing water and dry air;
   a first pipe configured to connect the outlet of the main body and the condensing unit and convey the heated air discharged through the outlet of the main body to the condensing unit;
   a second pipe configured to connect the condensing unit and the drying unit and convey the dry air separated by the condensing unit to the drying unit; and
   an intermediate pipe having one end branched off from the first pipe and the other end connected to the second pipe,
   wherein some of the heated air discharged through the outlet of the main body is supplied into the receiving section through the intermediate pipe via the drying unit, and
   the condensing unit is constituted by a first condenser formed of a cooling coil through which coolant circulates, and a second condenser formed of a heat absorption plate and heat radiating plate, which are formed of a plurality of diaphragms, and a thermoelectric element disposed therebetween, which are connected to each other.

2. The condensing dehumidifier according to claim 1, wherein a flow rate adjustment unit is installed at the intermediate pipe.

3. The condensing dehumidifier according to claim 1, wherein a cooling unit configured to initially cool the heated air discharged through the outlet of the main body is installed at the first pipe.

* * * * *